Figure 1:
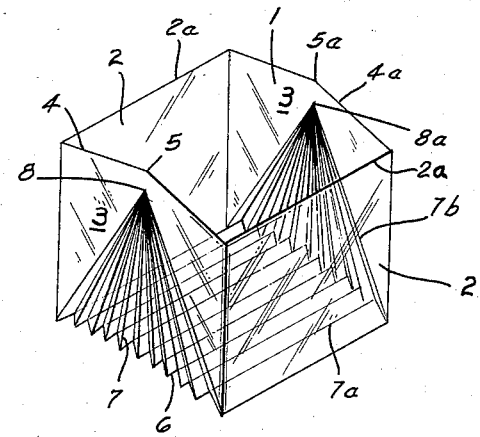

Feb. 12, 1963  C. L. WHITEFORD  3,077,295
UNIT DISPENSING PACKAGE
Filed Feb. 1, 1960

INVENTOR.
CARLTON L. WHITEFORD
BY
William S Henry
ATTORNEY.

+# United States Patent Office 3,077,295
Patented Feb. 12, 1963

3,077,295
UNIT DISPENSING PACKAGE
Carlton L. Whiteford, New Canaan, Conn., assignor to Poly-Pak Corporation of America, Springdale, Conn., a corporation of Delaware
Filed Feb. 1, 1960, Ser. No. 5,738
5 Claims. (Cl. 229—64)

This invention relates to a disposable plastic container adapted for use to dispense unit portions of solid, semi-solid or liquid foods, condiments and the like. More particularly, it relates to a disposable thermoplastic container capable of being sealed and which consists of a single piece of thermoplastic material hereinafter more clearly defined.

Containers adapted for use in dispensing unit portions of coffee cream, jellies, sugar, condiments and the like are widely known. In general the containers are of two piece manufacture comprising a plastic, glass or paper cup and a cover therefor of hard paper or cardboard. Such prior art containers suffer several disadvantages. First, they are uneconomical, for the reason that they are manufactured in two pieces, thus requiring assembly. Further, the covers do not always form an adequate air and dust seal. This can result in rapid spoilage. Second, they are not self-dispensing, that is, the contents, say coffee cream, cannot be readily dispensed or squeezed out of the container. It is necessary to both remove the cover and then pour the contents. Further, with the glass container, it is necessary to resterilize the container after each use or before refilling. Such a procedure is expensive and time consuming. Third, paper containers generally do not display the manufacturer's product. From a consumer's point of view, it is highly desirable to see or visualize the contained product. This cannot be done with paper containers. Fourth, where plastic containers have been used, they are generally top heavy when empty, since the heavier gauge material is at the mouth as well as when filled since the side walls are tapered to allow nesting and stacking of the container for economic transportation to the user. For instance, they frequently topple over when placed on a table either before, during or after use. This causes loss of product as well as table unsightliness. A one piece, transparent, stable container free of the aforementioned difficulties comprises the subject matter of this invention.

It is, therefore, a principal object of the present invention to provide a disposable, sealable, self-dispensing thermoplastic container of unitary construction.

It is a further object of the invention to provide a self-dispensing, disposable, positionally stable, and sealed thermoplastic container capable of being filled with unit portions of liquid, semi-liquid or solid food or condiment without concomitant spillage and rapid spoilage. Other objects will be apparent to those skilled in the art from the ensuing detailed description.

To this end, a one-piece thermoplastic container of novel structure is provided. The container comprises: a hollow cup-like structure, preferably in the form of a cube, bounded by two opposite smooth surfaces and interposed pleated or fluted surfaces. The flutes flaring outwardly from a midpoint located slightly below the edge or open end of the container and extending into the base of said cube, thus forming a relatively stable platform or wide based container. The hollow structure, which may be of varying dimensions, can then be supplied with substances such as coffee cream, jellies, ketchup, mustard and the like. Thereafter, the flat sides of the structure are folded or otherwise compressed inwardly from the base to the edges opposite the base, while simultaneously partially sealing those latter edges to confine the product and to protect the latter from rapid air oxidation and dust. When the product thus contained is desired, the user may neatly and readily dispense the container's contents by applying slight manual pressure against the container's flat surfaces. The seal will break and a unit portion will squeeze out. The container can then be conveniently disposed.

The container may be made from commercially available thermoplastic material, which may be translucent or opaque and preferably transparent. The material must be such that it can readily conform to sharply defined molds. In general, polyvinylchloride, polyethylene, polypropylene and polystyrene equivalents thereof are contemplated.

The use of polypropylene is preferred, particularly since it is translucent and permits for the ready inspection or visual observation of the product.

The plastic material of varying thickness, but preferably on the order of 5 to 10 mils is formed in a mold by known heat and pressure (positive and/or negative) forming techniques.

When the plastic container is withdrawn from the mold and supplied with the desired product, it is then closed by folding the side walls inwardly to form a generally triangular container. To seal the container, the open ends are heated to a temperature at or just below the melting point of the material and the free edges are brought together under a slight pressure to form a partial heat seal. The area of contact and the degree of penetration is made minimal so that only a partial heat seal is produced. It should be noted that only the free edges of the container are united. If more than just the edges are united, it may be necessary to tear or otherwise open the container other than by applying slight pressure against the flat sides thereof to break the seal. In lieu of fusing the edges, other suitable means may be utilized such as known adhesives, however, a heat seal is presently preferred.

An embodiment of the invention provides for the embossing or printing of the container's surfaces. Thus, the contents as well as the manufacturer can be readily identified.

In order to facilitate a further understanding of the present invention, reference to the accompanying drawings is now made. It is to be understood that the container as described is not deemed to be limited by the drawings thereof which show a presently preferred illustrative form of the invention.

Figure 2:
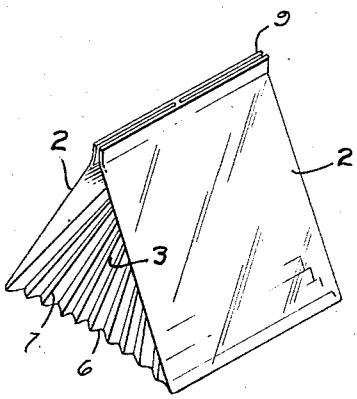
Figure 3:
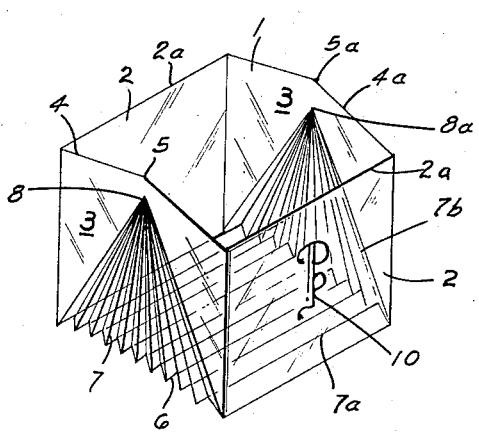

In the drawings:
FIGURE 1 is a perspective view of an open container of the invention in the form of a cube;
FIGURE 2 is a perspective view of the triangular container of FIGURE 1 subsequent to closure;
FIGURE 3 is a perspective view of the container of the invention of FIGURE 1, including printing on the flat side thereof.

FIGURE 1 depicts a hollow cubic container according to the invention having an opening 1 defined by opposed uninterrupted or planar side walls 2—2 and pleated side walls 3—3. The free edges of the planar side walls 2—2 are substantially straight and parallel with the base 6, whereas, the free end of the pleated side walls 3—3 is angled or arched slightly as at 4—4a from a mid-point 5—5a to make the free ends co-planar when the container is folded as shown in FIG. 2. Obviously the free ends of the container are readily heat sealed in such relation. The pleats 7 in side walls 3—3 radiate downwardly and outwardly from points 8—8a and are co-extensive with the pleats 7a in the bottom wall 6 of the container.

In FIGURE 2, a closed and sealed triangular structure as shown is obtained by pressing the smooth sides 3 and 3a inwardly and thereafter applying heat and pressure to form an edge seal shown at 9.

It will be obvious from FIGURE 2 that the edge seal 9 will be readily broken by squeezing the container to force the contents therefrom or by tearing the seal by pulling the side walls 2—2 apart.

FIGURE 3 shows the structure of FIGURE 1 together with printing at 10.

Though particular reference has been made in the above description to the shape of the container as a cube when opened and triangular when closed, the present invention contemplates any equivalent of such shapes.

I claim:

1. A unitary collapsible container comprising a generally cup shaped body of thermoplastic material selected from the group consisting of polyethylene, polypropylene, polystyrene and polyvinylchloride, said body material having a thickness not substantially greater than 10 mils and not substantially less than 5 mils, said body comprising a pair of opposed planar side walls and a pair of interposed integral pleated side walls and a bottom wall, the pleats of said side walls flaring downwardly and outwardly from a centrally located point in said pleated side walls spaced from the open end of said body and being continuous across said pleated bottom wall whereby the open end of said body may be closed by folding said pleated sides inwardly toward each other to form a generally triangular closed container and said container collapsed by urging said planar side walls into contact with each other.

2. A container according to claim 1 wherein the free edges of said side walls are fused to close and seal said container after said container is filled.

3. A container according to claim 1 wherein said body is in the form of a cube.

4. A container according to claim 3 wherein said container is closed by urging the free ends of said side walls into intimate contact and removably securing said ends by a partial heat seal.

5. A unitary self-dispensing collapsible container comprising a generally cup shaped body of polypropylene material on the order of 5 mils thickness, said body comprising a first pair of opposed side walls integral with and hingedly connected with a bottom wall, a second pair of opposed side walls integral with said first pair of side walls and said bottom wall and hingedly connected thereto, said bottom wall being pleated and said pleats being transverse to the plane of said second side walls, said pleats being continuous with pleats integral with said second side wall and terminating at a point adjacent the open end of said body whereby said body is collapsed by urging said side walls toward one another.

References Cited in the file of this patent

UNITED STATES PATENTS

| | | |
|---|---|---|
| 2,648,463 | Scherer | Aug. 11, 1953 |
| 2,705,579 | Mason | Apr. 5, 1955 |
| 2,738,107 | Graham | Mar. 13, 1956 |
| 2,899,110 | Parker | Aug. 11, 1959 |
| 2,942,760 | Schneider | June 28, 1960 |

FOREIGN PATENTS

| | | |
|---|---|---|
| 981,394 | France | May 25, 1951 |
| 474,705 | Canada | June 26, 1951 |

OTHER REFERENCES

Modern Packaging, page 140, October 1948.
Food Engineering, pages 20 and 22, July 1957.
Food Engineering, pages 74 and 75, November 1957.
Modern Packaging, page 161, November 1959.